Patented Aug. 3, 1943

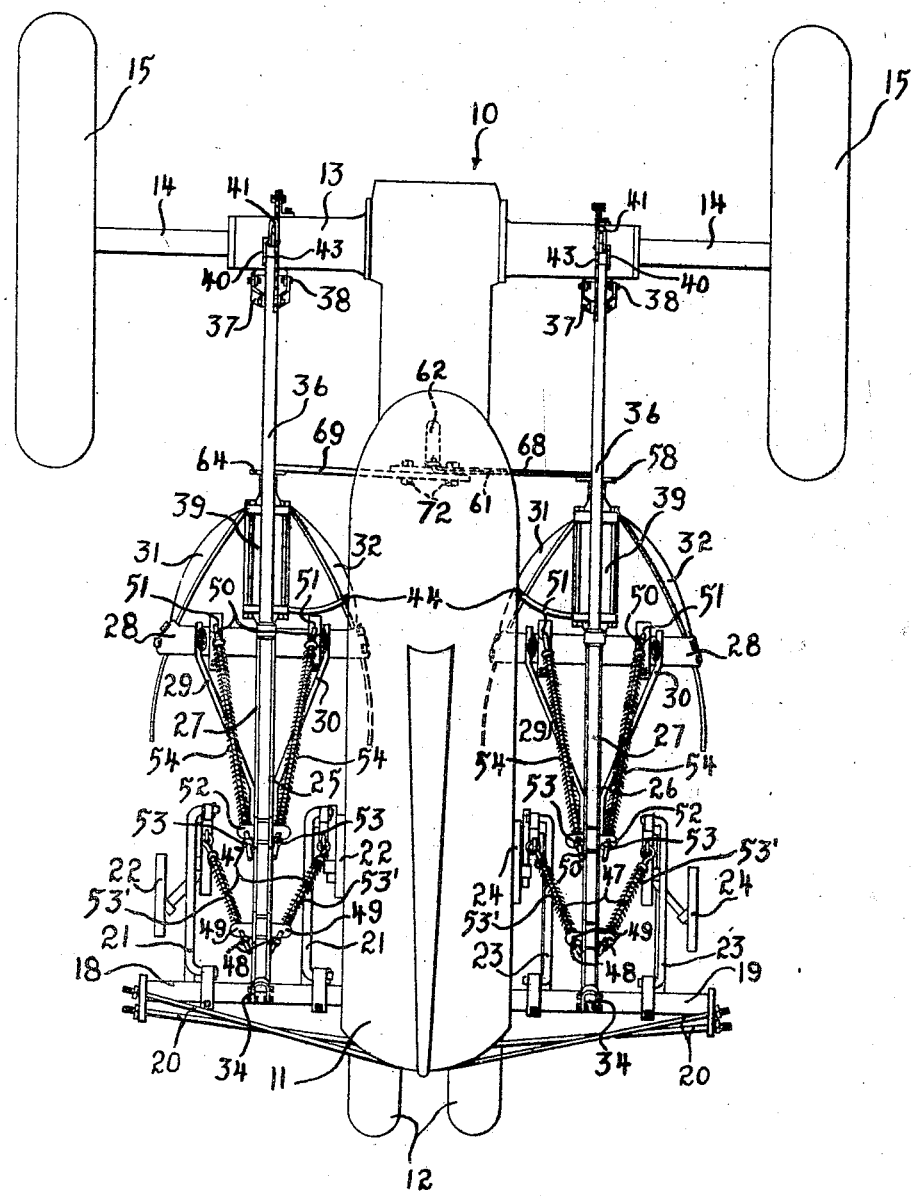

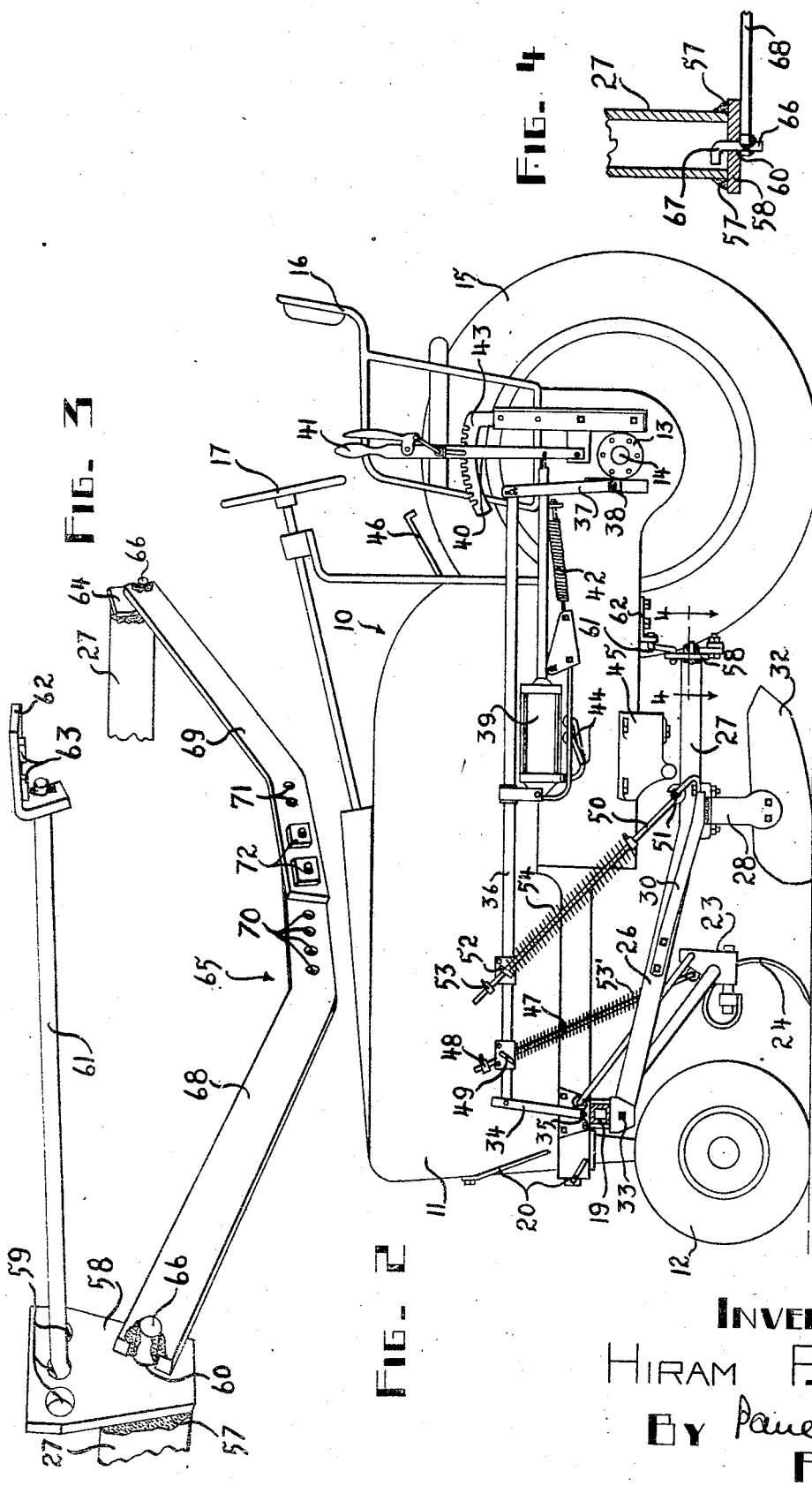

2,325,887

UNITED STATES PATENT OFFICE 2,325,887

POTATO HOE ATTACHMENT FOR TRACTORS

Hiram P. Smith, Canton, Ill., assignor to International Harvester Company, a corporation of New Jersey Application May 10, 1941, Serial No. 392,850

3 Claims. (Cl. 97—50)

This invention relates to potato hoe attachments for tractors and more particularly to the means for mounting the attachment on the tractor.

It is an object of the invention to provide a potato hoe attachment which is adapted to be connected to the supporting structure ordinarily used for the connecting of cultivator rigs to the forward portion of the tractor.

It is another object of the invention to provide a one-man potato hoe attachment adapted for connection to the forward portion of the tractor, wherein the same may be steered by the forward end of the tractor.

It is another object of the invention to provide a stabilizing means for this type of potato hoe attachment adapted for connection to the forward portion of the tractor, wherein the potato hoe structures will be maintained in their laterally spaced relation with respect to the tractor, and further to provide an adjustable means in the stabilizing means for positioning the potato hoe structures with respect to the tractor and with respect to each other.

According to the present invention, the potato hoe structures have been designed to be adapted for connection to the forward transverse supporting structures which are used for connecting the tractor and the cultivating rigs and arranged so that the opposed hoeing blades will be longitudinally alined with the respective cultivating rigs. The lifting means for lifting the cultivating rigs serves as means for the lifting of the potato hoe attachment, and they are movable together to a transport position. The potato hoe attachments are located at each side of the longitudinally extending body portion of the tractor. Connected between one of the potato hoe structures and the tractor is a vertically swingable stabilizing link. The potato hoe structure at the opposite side of the tractor is connected with the potato hoe structure connected with the tractor by means of the swingable link by a connecting means. This connecting means between the two potato structures is adjustable, and the swingable link between the tractor and the one potato structure can be adjusted by inserting the end in any of a plurality of holes on the potato hoe structure. The potato hoe structures, being connected to the forward portion of the tractor, are thereby adapted to be controlled by the forward steerable portion of the tractor. This makes possible the operation of a two-row potato hoe attachment by a single operator on the tractor.

For other objects and for a better understanding of the invention, reference may be had to the following detailed description taken in conjunction with the accompanying drawings, in which:

Figure 1 is a plan view of the tractor and of the potato hoe attachment connected thereto;

Figure 2 is a view in elevation of the tractor with one of the rear wheels removed and of the cultivating and potato hoe attachments;

Figure 3 is an enlarged detail perspective view of the connecting means between the tractor and one of the attachments and between one of the structures and between the two structures; and, Figure 4 is a detail view taken on the line 4—4 of Figure 2 and showing the connection of the connecting means with one of the potato hoe structures.

Referring now to the figures, there is shown a tractor 10 having a longitudinally extending body portion 11 having connected at its forward end a steerable wheel structure 12. Extending transversely of the rearward end of the body portion is a transverse rear axle structure or portion 13, through which extend the axles 14 for driving the tractor drive wheels 15. On this rear axle structure 13 is located an operator's station 16 from which the operator controls the steerable wheel structure 12 by a manual steering mechanism 17. Projecting laterally from each side of the tractor at its forward end are the transverse tool-supporting structures 18 and 19 located respectively at the right-hand and left-hand sides of the tractor. These structures are properly braced against rearward movement by means of tie rods 20. Connected in laterally spaced relation to the structure 18 is a pair of cultivating rigs 21 having cultivating tools 22. These rigs are spaced sufficiently to properly cultivate on opposite sides of a plant row, the plants passing between the same as the tractor proceeds across the field. On the left-hand side of the tractor are similarly arranged cultivating rigs 23 having cultivating tools 24.

Adapted to be connected to the transverse tool-supporting structures 18 and 19, between the connection of the respective rigs, are the potato hoe structures 25 and 26. Each of these potato hoe structures includes a rearwardly extending central beam 27 having near its rearward end a transverse member 28 rigidly retained in its transverse position by forwardly extending bridge members 29 and 30. On the outer ends of the transverse member and arranged in opposed relation with one another are the hoe blades 31 and 32. These blades are so spaced and alined with the cultivating rigs 21 that the loose dirt stirred up by the cultivating rigs will be collected thereby and hilled up onto the plant row. The hoe structures 25 and 26 are respectively connected to the supporting structures 18 and 19 for vertical pivotal movement, as indicated at 33.

As a means for lifting the cultivator rigs, there is usually provided a fore and aft pivotal lever 34 pivoted to the transverse structure, as indicated at 35. To the free end of the lever 34 is connected a fore and aft movable lift pipe 36 which is supported at its rearward end by a second fore and aft movable lever 37 pivoted on the rear axle structure of the tractor, as indicated at 38. Connected to the pipe 36 is a fluid cylinder device 39 adapted to react against a manual adjusting mechanism 40 having a hand lever 41. These cylinder devices 39 are of the single-acting type. They are maintained in their collapsed position by an overcenter spring means 42. When it is desired to change the working depth of the cultivating tools, the lever 41 is operated over its quadrant 43 to bodily move the cylinder device and the lift pipe 36. The cylinder devices 39 are connected by the hose connections 44 to receive fluid from a fluid housing and pump supply 45 mounted partially within the body portion 11 of the tractor. The operation of this fluid supply is controlled by a rearwardly extending control rod 46 accessible to the operator's station 16 on the rear axle structure of the tractor. The forward end of the lift pipes 36 are connected by means of lift rods 47 with the respective cultivating rigs 21. When the cylinder device 39 is operated and the lift rod 36 is moved forwardly, a collar 48 on the upper end of the lift rod 47 will engage a flange 49 carried by the lift pipe. Upon continued forward movement of the lift pipe 36, the rod 47 will carry with it the cultivating rig 21.

The potato hoe structure 25 is similarly connected to the lift pipe 36 by means of a lift rod 50 and, as indicated at 51, to the transverse member 28 thereof. The lift pipe 36 has also a flange 52 adapted to engage a collar 53 as the lift pipe 36 moves forwardly. Pressure springs 53' and 54 are respectively provided on the lifting rods 47 and 50 for holding the cultivating rigs and the potato hoe structure in their ground-working positions. It should now be apparent that the means for lifting the cultivating rigs can be used for lifting of the potato hoe structure, since the potato hoe structure is located and connected in close proximity to the cultivating rigs. By this lifting means both of the cultivating rigs and the potato hoe structures are simultaneously raised to the transport position on the tractor. While the above description has been made more particularly with reference to a single arrangement of cultivating rigs and potato hoe structure at one side of the tractor, it will be apparent that the description may be readily applied to the similar arrangement of cultivating rigs and potato hoe structures at the opposite side of the tractor.

Each central beam is of hollow construction, as best shown in Figure 4, and on the rearward ends of the beam there is welded, as indicated at 57, a plate 58 closing the open end of the beam. This plate 58 has at its upper end three transversely alined holes 59, and at its lower end, in alinement with the opening in the hollow opening in the central tool beam, an opening 60. This plate serves as a means for connection of the tool beam for the structure 27 at the left side of the tractor to the tractor by means of a vertically swingable stabilizing link 61. The upper end of the link 61 is connected by means of a bracket 62 rigidly connected to the under portion of the tractor by means of bolts 63. The lower end is connected with the plate 58 by insertion of the same into any one of the holes 59. By placing the lower end of the link 61 in any one of the holes 59, it is possible to laterally adjust the potato hoe structure with respect to the tractor. As that potato structure moves vertically while in working operation, it will always be retained in laterally spaced relation with respect to the tractor by means of the swingable link 61.

The central beam 27 of the potato structure 25 at the right side of the tractor also has connected to its rearward end a similar plate 64, which has an opening similar to the opening 60 in the plate 58 in alinement with the hollow chamber of the central beam, but does not have a set of adjustable holes. The beam structure 25, instead of being stabilized directly from the tractor, is stabilized and retained in its laterally spaced relation by connecting means 65 extending between the two beam structures 25 and 26. This connecting means 65 extends laterally underneath the tractor and has welded to its respective ends a forwardly extending pin 66 (see Figure 4). This pin 66 has a transverse retaining portion 67. When the connecting means is assembled to the ends of the central beams, the same will be manipulated so that the pin means 66 can be seated within the openings, such as at 60, in the plates 58 and 64. By the retaining portion 67, the connecting means will thereby be held against rearward displacement from the ends of the beams.

The connecting means 65 includes a pair of overlapping pieces 68 and 69, each of which, respectively, has holes 70 and 71. The length of the connecting means 65 may thus be determined by the alinement of the holes 70 and 71 through which extends clamping bolts 72. By this means the connecting means is shortened or lengthened, and the lateral positioning of one hole structure with respect to the other can be thereby varied. It should thus be apparent that, since the two potato hoe structures are connected together, they are laterally stabilized from the tractor as a unit.

It should now be apparent that there has been provided a potato hoe attachment adapted for connection to cultivating rig supporting structures located on the forward body portion, whereby the potato hoe attachment can be steered by the same means that the cultivating rigs are steered by. It will be also apparent that there has been provided a potato hoe structure which can be controlled by an operator on the tractor, that the lifting means for the cultivating attachments may be used for the lifting of the potato hoe structure, and that the potato hoe structures are laterally stabilized with respect to each other by the interconnection of the two by means of a connecting means under the tractor, and, by a single vertically swingable link connecting one of the structures with the tractor, both potato hoe structures can be stabilized with respect to the tractor as a unit.

While various changes may be made in the detail construction of the present arrangement, it shall be understood that such changes shall be within the spirit and scope of the present invention as defined in the appended claims.

What is claimed is:

1. In combination, a tractor having a longitudinally extending body portion and a transverse rear axle portion with an operator's station thereon, a transverse structure extending laterally from each side of the longitudinally extending body portion and at the forward part thereof, a pair of laterally spaced cultivating rigs connected to each transverse structure for vertical movement, a potato hoe structure including a longitudinally extending beam and opposed hoeing blades carried by the beam and arranged to hill the dirt loosened by the respective cultivating rigs, said structures being respectively connected to the transverse structures for vertical movement with respect thereto, the arrangement of both the rigs and the hoe structure being such as to be located ahead of the rear axle portion and forwardly visible from the operator's station, means for laterally stabilizing the potato hoe structures on both sides of the tractor including a transversely extending connecting means between the potato hoe structures and vertically swingable link member extending between one of the potato hoe structures and the tractor, and means for lifting the cultivating rigs and the potato hoe structures to a transport position.

2. In combination, a tractor having a longitudinally extending body portion and a transverse rear axle portion with an operator's station thereon, a transverse structure extending laterally from each side of the longitudinally extending body portion at the forward part thereof, a pair of laterally spaced cultivating rigs connected to each transverse structure for vertical movement, a potato hoe structure including a longitudinally extending beam and opposed hoeing blades carried by the beam and arranged to hill the dirt loosened by the respective cultivating rigs, said structures being respectively connected to the transverse structure for vertical movement with respect thereto, the arrangement of both the rigs and the hoe structure being such as to be located ahead of the rear axle portion and forwardly visible from the operator's station, means for laterally stabilizing the potato hoe structures with respect to the tractor, means for lifting the cultivating rigs, and means for connecting the potato hoe structure with the lifting means for the cultivating rigs, whereby the potato structures will be lifted by the lifting means for the cultivating rigs.

3. In combination, a tractor having a longitudinally extending body portion and a transversely extending rear axle structure, a transverse tool-supporting structure connected to the longitudinally extending body portion forwardly of the rear axle structure, a pair of laterally spaced cultivating rigs connected to the transverse structure for vertical movement with respect thereto, a potato hoe structure having a central beam and opposed hoeing blades carried thereon, said structure connected to the transverse tool-supporting structure for vertical movement, means for lifting the cultivating rigs including a fore and aft movable lift pipe, means for connecting the hoe structure to the lift pipes, whereby the hoe structure will be simultaneously lifted with the cultivating rigs.

HIRAM P. SMITH.